(12) United States Patent  (10) Patent No.: US 7,784,060 B2
Baumberger  (45) Date of Patent: Aug. 24, 2010

(54) EFFICIENT VIRTUAL MACHINE COMMUNICATION VIA VIRTUAL MACHINE QUEUES

(75) Inventor: Daniel Baumberger, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 1645 days.

(21) Appl. No.: 10/701,527

(22) Filed: Nov. 6, 2003

(65) Prior Publication Data

US 2005/0102671 A1 May 12, 2005

(51) Int. Cl.
*G06F 9/54* (2006.01)
*G06F 9/455* (2006.01)

(52) U.S. Cl. .......................................... 719/314; 718/1
(58) Field of Classification Search ................. 709/245; 707/1; 719/314
See application file for complete search history.

(56) References Cited

U.S. PATENT DOCUMENTS

| | | | |
|---|---|---|---|
| RE36,462 E * | 12/1999 | Chang et al. ................. 711/209 |
| 6,075,938 A * | 6/2000 | Bugnion et al. ............... 703/27 |
| 6,223,202 B1 * | 4/2001 | Bayeh ......................... 718/102 |
| 6,345,351 B1 * | 2/2002 | Holmberg .................... 711/203 |
| 6,961,941 B1 * | 11/2005 | Nelson et al. ................ 719/319 |
| 7,069,413 B1 * | 6/2006 | Agesen et al. ............... 711/207 |
| 7,181,744 B2 * | 2/2007 | Shultz et al. ................. 718/104 |
| 7,412,492 B1 * | 8/2008 | Waldspurger ............... 709/216 |
| 2004/0168030 A1 * | 8/2004 | Traversat et al. ............ 711/133 |
| 2004/0221285 A1 * | 11/2004 | Donovan et al. ............... 718/1 |
| 2004/0267691 A1 * | 12/2004 | Vasudeva ......................... 707/1 |
| 2005/0039180 A1 * | 2/2005 | Fultheim et al. ............... 718/1 |
| 2005/0076156 A1 * | 4/2005 | Lowell .......................... 710/1 |
| 2005/0086237 A1 * | 4/2005 | Monnie et al. .............. 707/100 |

* cited by examiner

*Primary Examiner*—Van H Nguyen
*Assistant Examiner*—Abdou K Seye
(74) *Attorney, Agent, or Firm*—Hanley, Flight & Zimmerman, LLC

(57) ABSTRACT

A system, method and computer program product for communicating between two virtual machines including utilizing first and second virtual machine queues associated with respective first and second virtual machines to communicate between the virtual machines.

10 Claims, 6 Drawing Sheets

EFFICIENT VIRTUAL MACHINE COMMUNICATION VIA VIRTUAL MACHINE QUEUES

BACKGROUND OF THE INVENTION

1. Field of the Invention

Embodiments of the present invention relate generally to a system and method for efficient communication between and among virtual machines, and more particularly to the use of virtual machine queues to communicate between and among virtual machines.

2. Related Art

In a computer environment, multiple virtual machines (VMs) can run on one platform at the same time. These virtual machines may contain standard operating systems, such as, e.g., Microsoft Windows® or Linux, or a much smaller operating system. When multiple VMs are running on a platform at a given time, the need may arise for the VMs to communicate with each other.

Inter-virtual machine (VM) communication currently consists of two different software-based techniques. First, communication via a network is the most common technique because most VMs have network adapters. Second, shared memory is used to map a block of memory into each of the VMs' address spaces that need to communicate. Access to this memory is then synchronized via a software-based semaphore bit or some other synchronization mechanism.

Each of the above-described techniques has limitations. The networking technique requires full networking stacks in each of the VMs, which creates large overhead. Additionally, both VMs must be running compatible network protocols and be able to discover each other to establish communication. Shared memory is limited by the size of the shared memory block. In other words, it does not work for communication that needs to move variable-sized blocks of data between VMs. Further, the synchronization model is also difficult because each VM needs to have software running to understand the synchronization model.

BRIEF DESCRIPTION OF THE DRAWINGS

Various exemplary features and advantages of embodiments of the invention will be apparent from the following, more particular description of exemplary embodiments of the present invention, as illustrated in the accompanying drawings wherein like reference numbers generally indicate identical, functionally similar, and/or structurally similar elements.

DETAILED DESCRIPTION OF EXEMPLARY EMBODIMENTS OF THE PRESENT INVENTION

Exemplary embodiments of the invention are discussed in detail below. While specific exemplary embodiments are discussed, it should be understood that this is done for illustration purposes only. A person skilled in the relevant art will recognize that other components and configurations can be used without parting from the spirit and scope of the invention.

An exemplary embodiment of the present invention includes a system, method, and computer program product for highly efficient, variable length data sharing between virtual machines (VMs). Through the use of virtual machine (VM) queues, an exemplary embodiment of the invention provides an instruction-level mechanism to transfer pages and/or messages between VMs. An exemplary embodiment of the invention further allows variable-sized blocks of data to be moved between VMs in 4 KB or 4 MB page granularity, for example. In such an embodiment, the central processing unit (CPU) provides synchronization of the VM queues to ensure uniform and secure synchronization.

Figure 1:
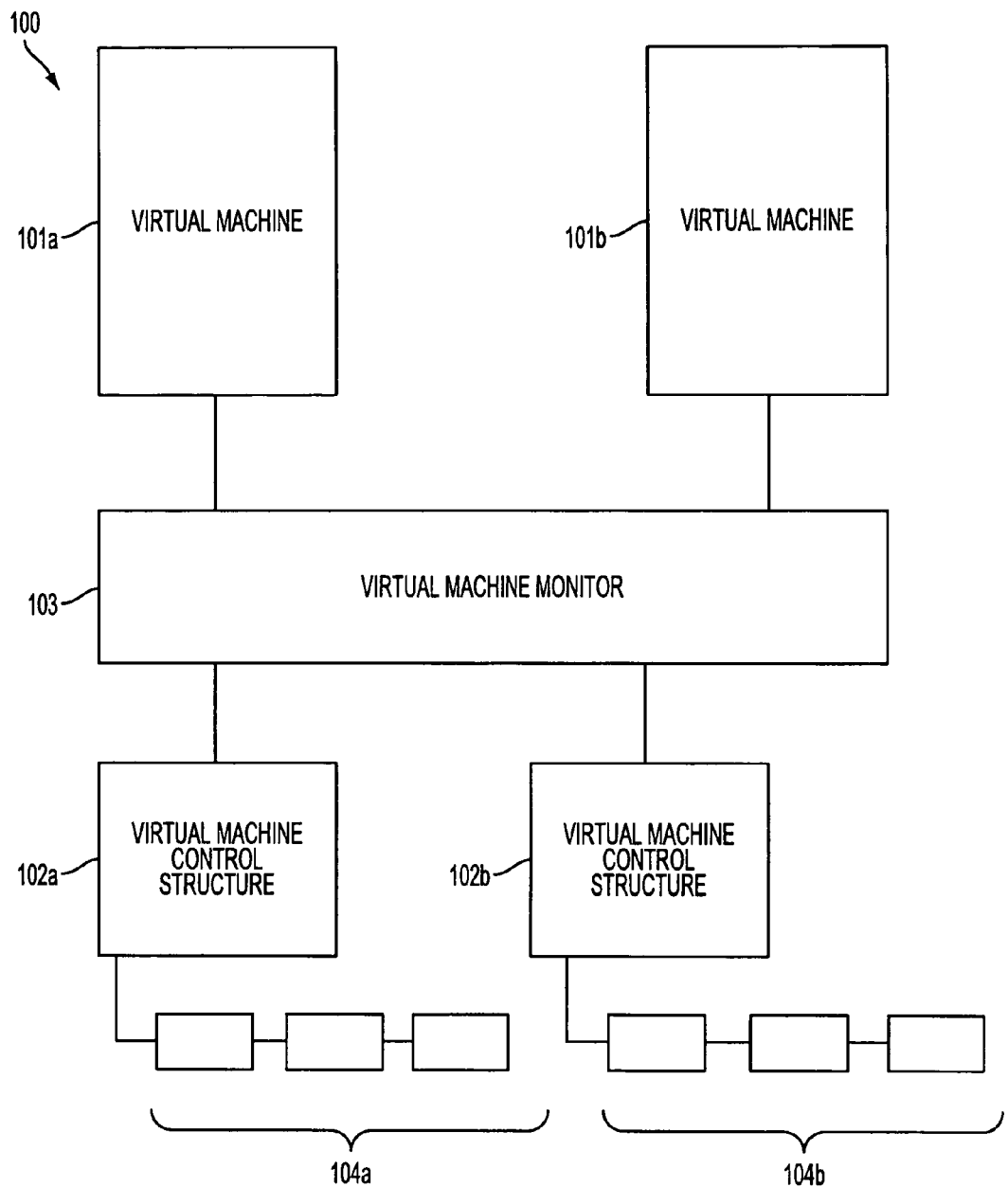
FIG. 1 depicts an exemplary embodiment of a computer system according to an exemplary embodiment of the invention.

Referring now to the drawings, FIG. 1 depicts an exemplary embodiment of a computer system 100 according to an exemplary embodiment the present invention. Computer system 100 can have VMs 101a, 101b, a VM monitor 103, VM control structures 102a, 102b and VM queues 104a, 104b. VMs 101a, 101b can contain standard operating systems such as, e.g., Windows® or Linux, or a much smaller operating system. In an exemplary embodiment of the invention, VMs 101a, 101b can be an abstraction of a processor (not shown) for enforcing memory restrictions, input/output restrictions, register restrictions, and the like. Each VM 101a, 101b can define an address space within which to operate. VMs 101a, 101b can also run software within the VM that is limited by the size and other restrictions placed on the VM, for example.

VM monitor 103 can be software, for example, that can create and manage VMs, handle access to virtual devices, and facilitate sharing and isolation between the VMs.

As shown in FIG. 1, each VM control structure 102a, 102b is associated with a respective VM 101a, 101b. In an exemplary embodiment of the invention, the VM control structures 102a, 102b describe the associated VM in terms of access rights to memory regions and what types of accesses, such as, e.g., memory, input/output, or the like, can cause a VM to exit into the VM monitor 103.

Each VM control structure 102a, 102b can have an associated VM queue. As shown in FIG. 1, VM control structure 102a can be associated with VM queue 104a and VM control structure 102b can be associated with VM queue 104b. VM queues 104a, 104b are mapped into the address space of the VM and referenced by the software of an associated VM.

During operation of computer system 100, VM queue references are always relative to the currently operating VM because the processor (not shown) only knows about the VM control structure associated with the currently operating VM and the VM monitor. For example, when VM 101a is running, the processor can only access pages or messages in VM queue 104a because the processor only knows about VM control structure 102a and VM monitor 103. If a need arises for the processor to access items in VM queue 104b, VM monitor 103 must cause a VM exit and then give the processor access to VM queue 104b. For purposes of this application, a VM exit can be defined as any event that causes the processor to stop execution of the current VM and return control to the VM monitor including, but not limited to, such events as faults, exceptions, interrupts, memory accesses, IO accesses, control register access, special virtualization instructions, etc. A "natural" VM exit can be any event that causes a VM exit that is not an explicit VM exit request by the software running in the VM, i.e. a VM exit that is not caused by an instruction intended specifically to cause a VM exit.

Figure 2:
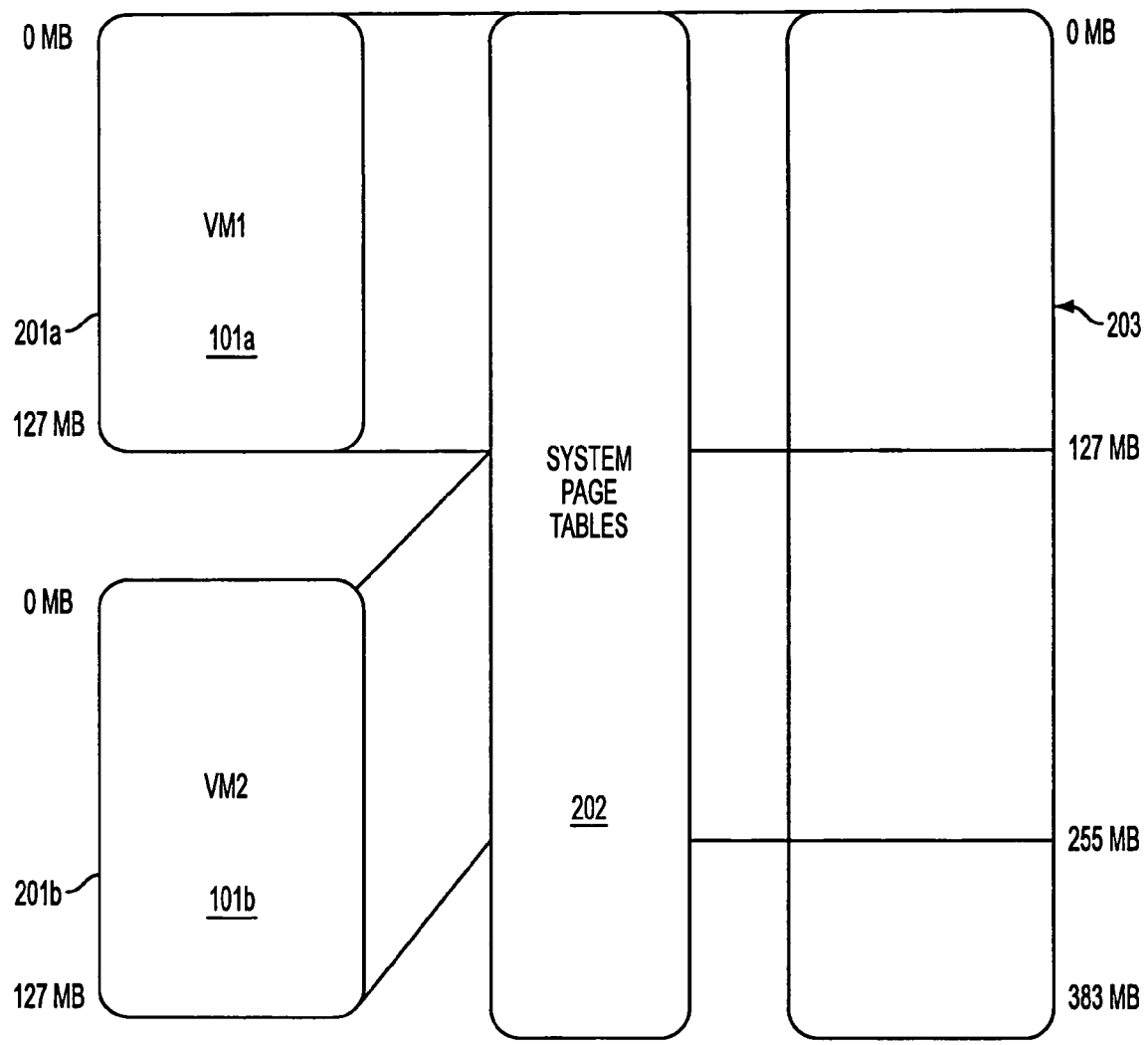
FIG. 2 depicts an exemplary arrangement of computer memory in an exemplary embodiment of the present invention.

Computer system 100 can provide an exemplary method to allow VM 101*a* to communicate with VM 101*b* via VM queues 104*a*, 104*b*, for example. FIG. 2 depicts an exemplary embodiment of an initial memory allocation between to VMs using a simple memory mapping technique as would be recognized by a person having ordinary skill in the art. FIG. 2 shows guest memory 201*a* of VM 101*a*, guest memory 201*b* of VM 101*b*, page table 202, and physical host memory 203. In an exemplary embodiment of the invention, guest memory 201*a*, 201*b* can be the virtual address space within which a VM can operate. As shown in FIG. 2, VM 101*a* receives 128 MB, for example, of guest memory, and the VM monitor 103 (not shown in FIG. 2) establishes the range of guest memory 201*a* from 0-127 MB. Similarly, VM 101*b* receives 128 MB, for example, of guest memory, and the VM monitor 103 establishes the range of guest memory 201*a* from 0-127 MB. In this example, the addresses for guest memory 201*a* match those of physical host memory 203. The addresses for guest memory 201*b* are offset by 128 MB.

Page table 202 can automatically map guest memories 201*a*, 201*b* into host physical memory 203. Each VM 101*a*, 101*b*, however, can only access the respective 128 MB, for example, of guest memory 201*a*, 201*b* that the VM 101*a*, 101*b* was assigned. Further, each VM 101*a*, 101*b* interprets the range of guest memory 201*a*, 201*b* to begin with zero.

Figure 3:
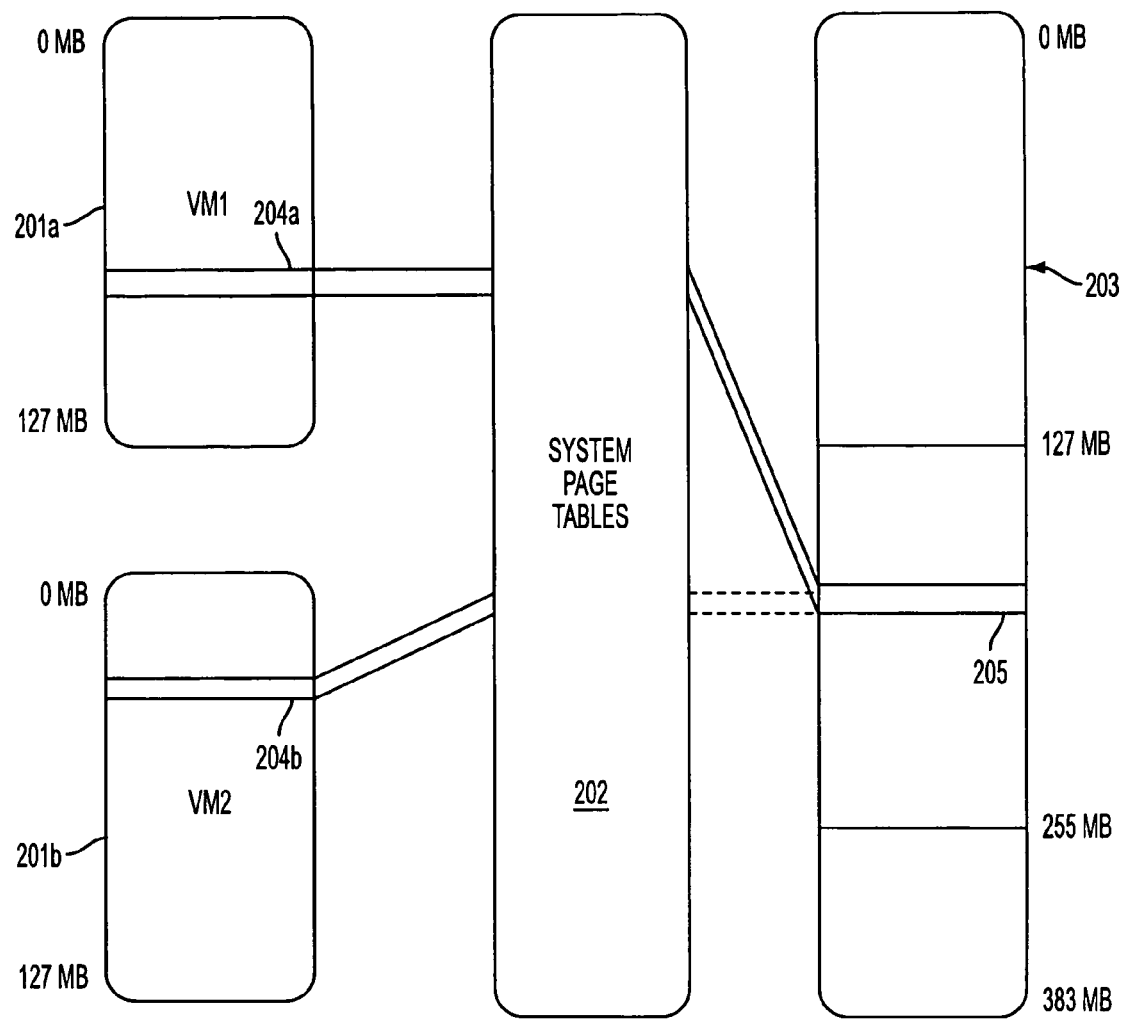
FIG. 3 depicts an exemplary arrangement of computer memory in an exemplary embodiment of the present invention.

FIG. 3 depicts an exemplary method for remapping a page in address space 201*b* of VM 101*b* into the address space 201*a* of VM 101*a*. As an example, the page inside address 204*b* of guest memory 201*b* of VM 101*b* is initially associated with address 205 of host physical memory 203 (as indicated by the broken lines). When the page table 202 is updated by the processor (not shown), the page inside address 204*a* of guest memory 201*a* of VM 101*a* now points to address 205 of physical host memory 203. By updating page table 202, the page associated with VM 101*b* is now associated with VM 101*a*.

Figure 4:
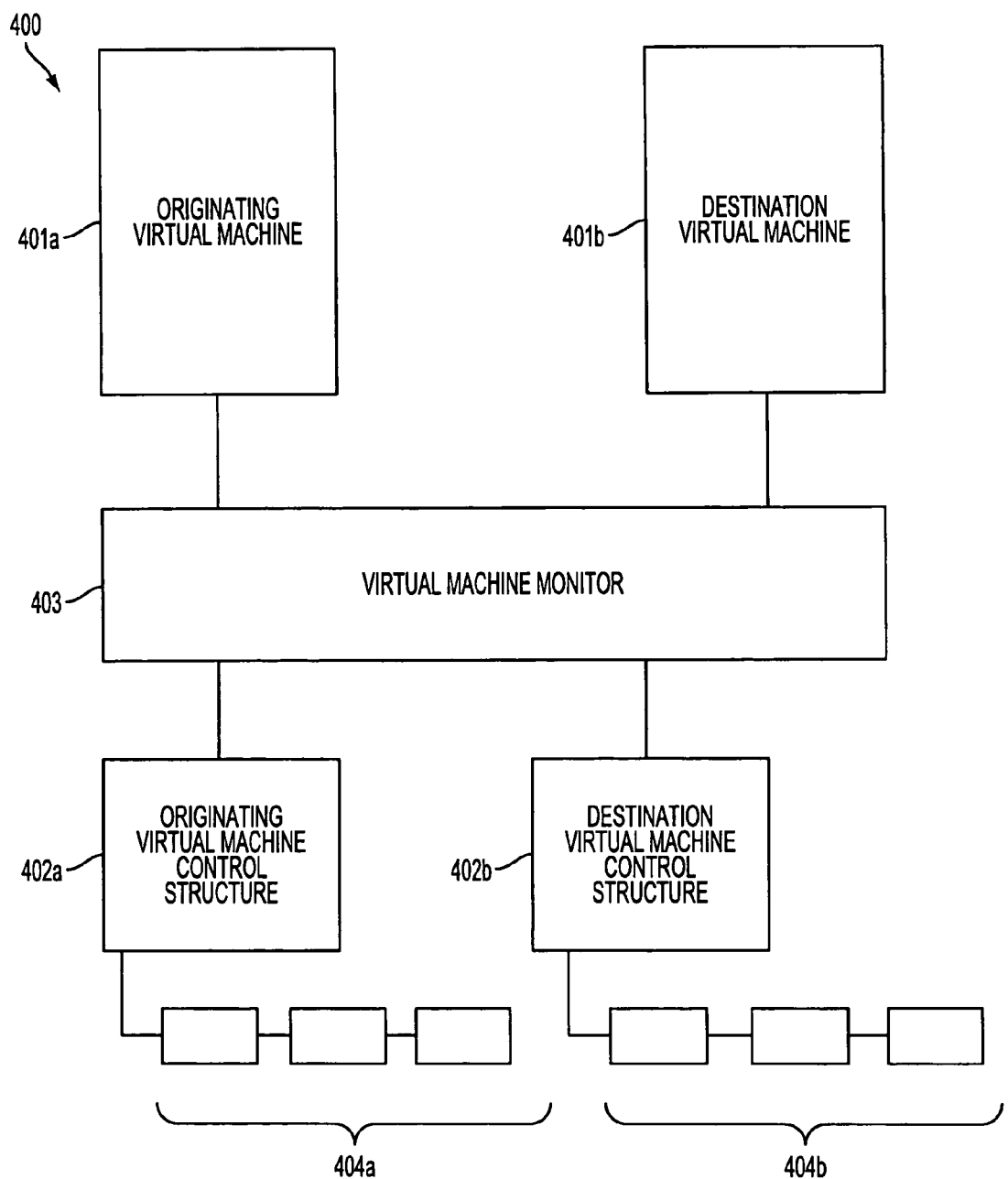
FIG. 4 depicts an exemplary embodiment of a computer system according to an exemplary embodiment of the invention.

FIG. 4 depicts an exemplary computer system 400 for communicating between two VMs using VM queues. Computer system 400 can include originating VM 401*a*, destination VM 401*b*, originating VM control structure 402*a*, destination VM control structure 402*b*, VM monitor 403, originating VM queue 404*a*, and destination VM queue 404*b*. Originating VM 401*a* is associated with originating VM control structure 402*a* and originating VM queue 404*a* through VM monitor 403. Similarly, destination VM 401*b* is associated with destination VM control structure 402*b* and destination VM queue 404*b* through VM monitor 403.

VM queues 404*a*, 404*b* can be used to update a page table, and thus allow two or more VMs to communicate. For example, if originating VM 401*a* desires to communicate with destination VM 401*b*, originating VM 401*a* can place a message, such as, e.g., a 4 KB or 4 MB page, into VM queue 404*b* of destination VM 401*b*. In an exemplary embodiment of the invention, the amount of data being transferred during successive communications between VMs can vary and does not have to be constant.

Figure 5:
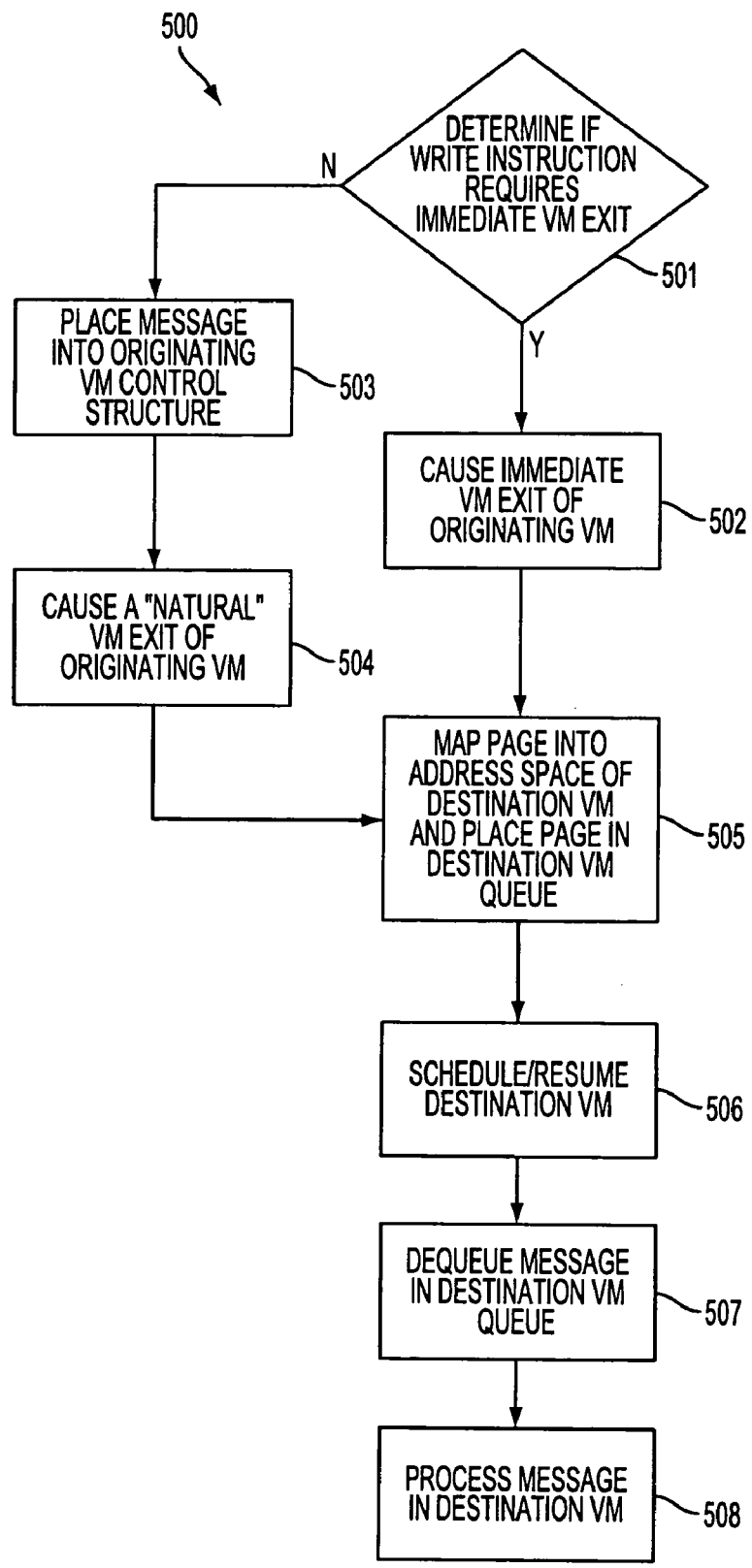
FIG. 5 depicts an exemplary flow diagram for illustrating an exemplary method according to the present invention.

FIG. 5 depicts flow diagram 500 which illustrates an exemplary method according to the present invention for placing a message into destination VM queue 404*b* from originating VM 401*a*, for example. It will be understood by a person having ordinary skill in the art that the exemplary method can be reversed to allow destination VM 401*b* to place a message into originating VM queue 404*a*.

In step 501, originating VM 401*a* can determine whether the write instruction that ultimately places the message into the destination VM queue requires an immediate VM exit. If the write instruction requires an immediate VM exit, flow diagram 500 can proceed to step 502. In step 502, the write instruction can cause an immediate VM exit so that VM monitor 403 can process the delivery of the message. If the write instruction does not require an immediate VM exit, flow diagram 500 can proceed to step 503.

In step 503, the write instruction can include a so-called "lazy write policy." In other words, the write instruction does not cause an immediate VM exit from originating VM 401*a*, but places the message into originating VM control structure 402*a* to be delivered when originating VM 401*a* causes a "natural" VM exit of originating VM 401*a* during step 504.

During step 505, once originating VM 401*a* exits, for example, via an immediate VM exit or a "natural" VM exit, VM monitor 403 can deliver the message to destination VM 401*b* by mapping the page into the address space (not shown in FIG. 4) of destination VM 401*b* and placing the message into destination VM queue 404*b*. Once the page has been placed in destination VM queue in step 505, flow diagram 500 can proceed to step 506. In step 506, VM monitor 403 can resume and/or schedule destination VM 401*b* and execute an instruction to read a message from VM queue 404*b*. Once step 506 is completed, the next message waiting in destination VM queue 404*b* can be dequeued during step 507. Once the message had been dequeued in step 507, flow diagram 500 can proceed to step 508. During step 508, destination VM 401*b* can process the message. As will be understood by a person having ordinary skill in the art, destination VM 401*b* can use software to process the message.

In an exemplary embodiment of the invention, an instruction can be provided for determining the length of a VM queue. Determining the length of a VM queue can advantageously avoid VM exits when the VM control structure is accessing an empty queue, for example. If no message is in the VM queue (associated with the currently executing VM), a VM exit will occur to allow the VM monitor to schedule another VM to execute.

Figure 6:
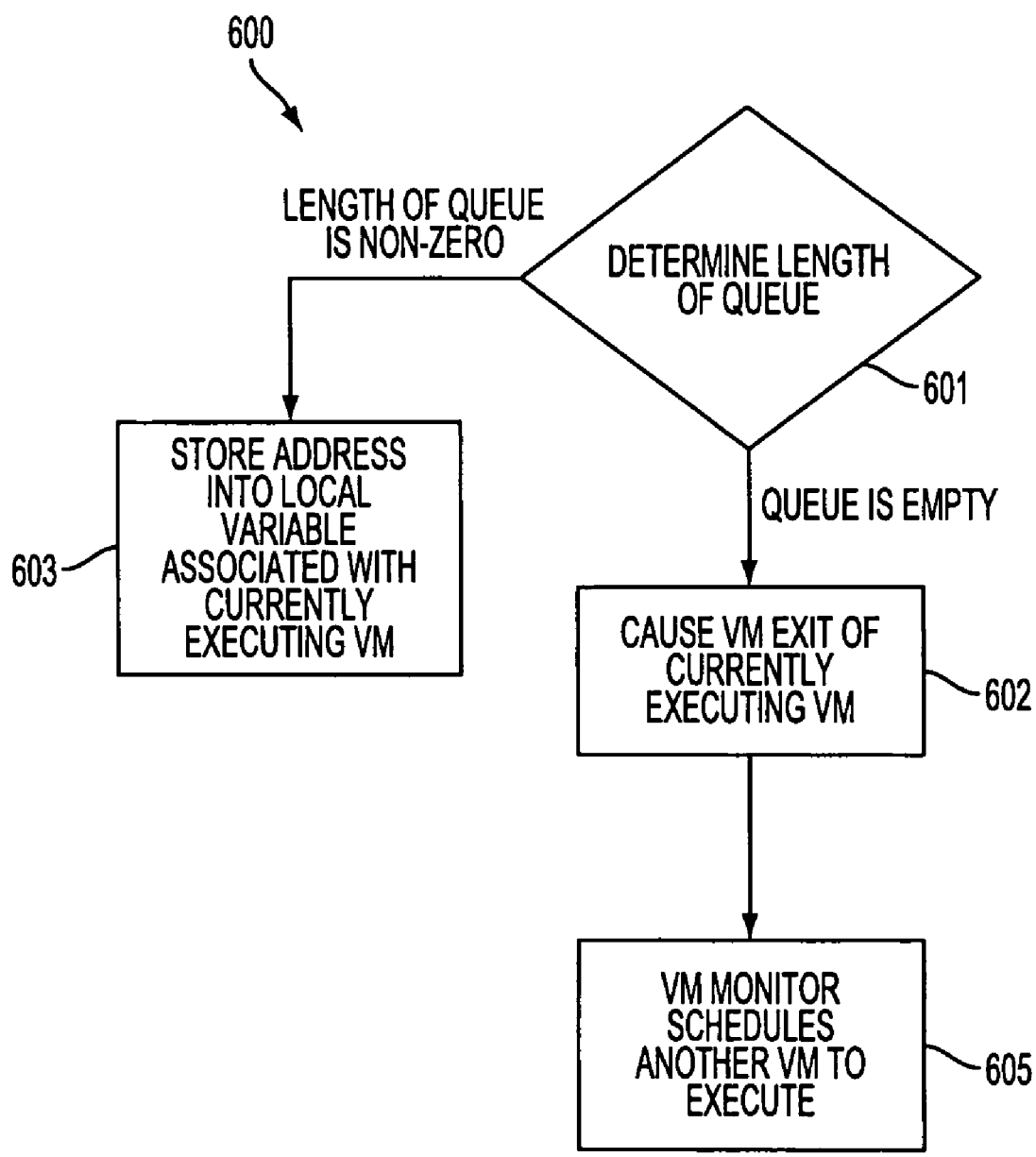
FIG. 6 depicts an exemplary flow diagram for illustrating an exemplary method according to the present invention.

FIG. 6 depicts flow diagram 600, which illustrates an exemplary embodiment of the dequeueing step of an exemplary method according to the present invention. During step 601, depending upon the software running in the currently executing VM, the VM control structure of the currently executing VM can determine the length, i.e., the number of messages, waiting in the queue. If the queue is empty, flow diagram can proceed to step 602. During step 602, a VM exit can occur so that the VM monitor can schedule another VM to execute during step 605 or, alternatively, the software running in the VM can choose to continue performing other tasks. If the VM queue is not empty, flow diagram can proceed to step 603. During step 603, the address can be stored into a local variable associated with the currently executing VM.

In an exemplary embodiment of the invention, an instruction can be provided for conveying identification information from one VM to another VM. In this exemplary embodiment, a software entity that knows about the establishment of the VMs can be used to write to the queues of the other VMs. For example, software running as part of the VM monitor or an interface to the VM monitor can obtain identification information to be conveyed to other VMs. After the identification information of one VM has been conveyed to another VM, the software or interface can then establish a protocol using the VM queues. For example, in an exemplary embodiment of the invention, if multiple VMs are used to accomplish a single task, such as, e.g., play an audio file, each of the multiple VMs can be used to accomplish an individual task, such as, e.g., read the file, decode the file, and write to the audio device. In such an example, as would be understood by a person having ordinary skill in the art, each of the VMs would need to know information necessary to communicate with the VM that accomplishes the next task. For example, the "read" VM would need to know information about the "decode" VM so that the "read" VM is able to pass the file that is read to the "decode" VM using, for example, the exemplary method described above.

When the "read" VM passes the file to the "decode" VM, software running in association with the "read" and "decode" VMs can exchange VM identification information so that the VM monitor can then establish their protocol via the VM queue mechanism.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that the invention may be practiced otherwise than as specifically described.

What is claimed is:

1. A method comprising:
    placing a message from a first virtual machine associated with a first virtual machine queue into a second virtual machine queue associated with a second virtual machine, wherein the message is associated with a page of a first address space of the first virtual machine;
    mapping the page of the first address space to be associated with a second address space of the second virtual machine by updating a page table, via a processor;
    determining whether a write instruction used to place the message in the second virtual machine queue involves an immediate virtual machine exit;
    when the write instruction involves an immediate virtual machine exit, causing an immediate virtual machine exit associated with the first virtual machine such that a virtual machine monitor can process the message, and, when the write instruction does not involve an immediate virtual machine exit, processing the message in response to a natural virtual machine exit; and
    causing the second virtual machine to process the message.

2. The method according to claim 1, further comprising dequeueing the second virtual machine queue.

3. The method according to claim 2, wherein dequeueing includes storing an address associated with the page into a local variable associated with the second virtual machine.

4. The method according to claim 1, further comprising:
    conveying identification information associated with the first and second virtual machines between the first and second virtual machines via the first and second virtual machine queues.

5. A computer system comprising:
    at least one hardware processor; and
    a computer readable memory comprising program instructions, executable by the at least one processor, for:
    a first virtual machine control structure associated with a first virtual machine, the first virtual machine control structure having a first virtual machine queue adapted to enqueue and dequeue a message;
    a second virtual machine control structure associated with a second virtual machine, the second virtual machine control structure having a second virtual machine queue adapted to enqueue and dequeue a message, the second virtual machine queue to receive a message from the first virtual machine, wherein the message is associated with a page of a first address space of the first virtual machine; and
    a virtual machine monitor to map the page of the first address space to be associated with a second address space of the second virtual machine by updating a page table, the virtual machine monitor to cause the second virtual machine to process the message,
    wherein the first virtual machine is to determine whether a write instruction used to place the message into the second virtual machine queue involves an immediate virtual machine exit, and
    wherein the first virtual machine undergoes an immediate VM exit in response to determining that the write instruction involves an immediate exit, and wherein the virtual machine monitor processes the message in response to a natural exit when the write instruction does not involve an immediate exit.

6. The computer system according to claim 5, wherein the first virtual machine is to receive a second message from the second virtual machine, wherein the message is associated with a second page of a second address space of the second virtual machine.

7. The computer system according to claim 5, wherein the virtual machine monitor is further adapted to convey identification information associated with the first and second virtual machines between the first and second virtual machines via the first and second virtual machine queues.

8. A computer memory having instructions stored thereon that, when executed, cause a machine to:
    place a message from a first virtual machine associated with a first virtual machine queue into a second virtual machine queue associated with a second virtual machine, wherein the message is associated with a page of a first address space of the first virtual machine;
    map the page of the first address space to be associated with a second address space of the second virtual machine by updating a page table;
    determine whether a write instruction used to place the message in the second virtual machine queue involves an immediate virtual machine exit;
    when the write instruction involves an immediate virtual machine exit, cause an immediate virtual machine exit associated with the first virtual machine such that a virtual machine monitor can process the message;
    when the write instruction does not involve an immediate virtual machine exit, process the message in response to a natural virtual machine exit; and
    cause the second virtual machine to process the message.

9. The computer memory according to claim 8 having instructions stored thereon that, when executed, cause a machine to:
    dequeue the second virtual machine queue.

10. The computer memory according to claim 9, wherein dequeuing the second virtual machine queue includes storing an address associated with the page into a local variable associated with the second virtual machine.

* * * * *